(12) United States Patent
Lee (10) Patent No.: US 8,645,139 B2
(45) Date of Patent: Feb. 4, 2014

(54) APPARATUS AND METHOD OF EXTENDING PRONUNCIATION DICTIONARY USED FOR SPEECH RECOGNITION

(75) Inventor: Gil Ho Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 807 days.

(21) Appl. No.: 12/710,597

(22) Filed: Feb. 23, 2010

(65) Prior Publication Data

US 2010/0312550 A1  Dec. 9, 2010

(30) Foreign Application Priority Data

Jun. 3, 2009  (KR) .................. 10-2009-0048847

(51) Int. Cl.
*G10L 15/04*  (2013.01)

(52) U.S. Cl.
USPC ........................................................ 704/254

(58) Field of Classification Search
USPC ................................................. 704/246–257
See application file for complete search history.

(56) References Cited

U.S. PATENT DOCUMENTS

| | | | |
|---|---|---|---|
| 5,625,749 A * | 4/1997 | Goldenthal et al. ........... | 704/254 |
| 2002/0152068 A1 | 10/2002 | Neti et al. | |
| 2004/0230420 A1* | 11/2004 | Kadambe et al. ............. | 704/205 |
| 2005/0075877 A1* | 4/2005 | Minamino et al. ............ | 704/254 |
| 2008/0147404 A1* | 6/2008 | Liu et al. .................... | 704/256.2 |
| 2008/0270133 A1 | 10/2008 | Tian et al. | |
| 2010/0211376 A1* | 8/2010 | Chen et al. ........................ | 704/2 |

FOREIGN PATENT DOCUMENTS

| | | |
|---|---|---|
| JP | 2003-271179 | 9/2003 |
| JP | 2005-234504 | 9/2005 |
| JP | 2005-258443 | 9/2005 |
| JP | 2007-248742 | 9/2007 |
| JP | 2008-076730 | 4/2008 |
| JP | 2008-275731 | 11/2008 |
| JP | 2009-03110 | 1/2009 |
| KR | 1999-0080346 | 11/1999 |
| KR | 2003-1668 | 1/2003 |
| KR | 2004-61070 | 7/2004 |
| KR | 2006-43845 | 5/2006 |
| KR | 2008-18622 | 2/2008 |

OTHER PUBLICATIONS

Anne Cutler and Roger K Moore, "Spoken Language Processing by Mind and Machine," Tutorial given at Interspeech 2007, Aug. 27, 2007, Antwerp, Belgium, 125 slides / 63 pages.
Interspeech 2007 Conference Schedule, "Interspeech 2007 Conference Schedule at a Glance," Aug. 27-31, 2007, Antwerp, Belgium, 3 pages, http://www.interspeech2007.org/Technical/program_overview.php (accessed or printed on Feb. 5, 2010).

* cited by examiner

*Primary Examiner* — Abul Azad
(74) *Attorney, Agent, or Firm* — NSIP Law (57) ABSTRACT

An apparatus and method for extending a pronunciation dictionary for speech recognition are provided. The apparatus and the method may segment speech information of an input utterance into at least one phoneme, collect segmentation information of the at least one segmented phoneme, analyze a pronunciation variation of the at least one segmented phoneme based on the collected segmentation information, and select a substitutable phoneme group for the at least one phoneme where the pronunciation variation occurs, and extend the pronunciation dictionary.

19 Claims, 7 Drawing Sheets

| | Bilabial | Labio-dental | Dental | Alveolar | Post-alveolar | Retroflex | Palatal | Velar | Uvular | Pharyngeal | Epi-glottal | Glottal |
|---|---|---|---|---|---|---|---|---|---|---|---|---|
| Nasal | m | ɱ | | n | | ɳ | ɲ | ŋ | ɴ | | | |
| Plosive | p b | p̪ b̪ | | t d | | ʈ ɖ | c ɟ | k g | q ɢ | | ʡ | ʔ |
| Fricative | ɸ β | f v | θ ð | s z | ʃ ʒ | ʂ ʐ | ç ʝ | x ɣ | χ ʁ | ħ ʕ | H ʢ | h ɦ |
| Approximant | | ʋ | | ɹ | | ɻ | j | ɰ | | | | |
| Trill | ʙ | | | r | | | | | ʀ | | ʜ | |
| Tap, Flap | | ⱱ | | ɾ | | ɽ | | | | | | |
| Lateral fricative | | | | ɬ ɮ | | | ʎ̥ | ʟ̝ | | | | |
| Lateral approximant | | | | l | | ɭ | ʎ | ʟ | | | | |
| Lateral flap | | | | ɺ | | ɭ̆ | | | | | | |

```
        Front  Near front  Central  Near back  Back
Close     i • y            ɨ • ʉ              ɯ • u
Near close      ɪ • ʏ              ʊ
Close mid     e • ø         ɘ • ɵ              ɤ • o
Mid                          ə
Open mid      ɛ • œ         ɜ • ɞ              ʌ • ɔ
Near open       æ            ɐ
Open          a • ɶ                             ɑ • ɒ
```

FIG. 5

FIG. 6 ations of the sounds that make up each word. The compiling is often referred to as training. The language model is generally a file containing the probabilities of a sequence of words.

APPARATUS AND METHOD OF EXTENDING PRONUNCIATION DICTIONARY USED FOR SPEECH RECOGNITION

CROSS-REFERENCE TO RELATED APPLICATION

This application claims the benefit under 35 U.S.C. §119(a) of a Korean Patent Application No. 10-2009-0048847, filed on Jun. 3, 2009, in the Korean Intellectual Property Office, the entire disclosure of which is incorporated herein by reference for all purposes.

BACKGROUND

1. Field

The following description relates to an apparatus and method of extending a pronunciation dictionary for pronunciation transcription correction of a speech database used for an acoustic model training for speech recognition.

2. Description of the Related Art

In general, a high-capacity speech recognition system may use an acoustic model, a language model, and a pronunciation dictionary. An acoustic model may be used to recognize a characteristic of a speech signal.

Speech recognition systems may use two types of files to recognize speech, an acoustic model and a language model. The acoustic model is typically created by taking audio recordings and compiling them into statistical representations of the sounds that make up each word. The compiling is often referred to as training. The language model is generally a file containing the probabilities of a sequence of words.

A mass storage speech database is used for the acoustic model. Also, a process of extracting a characteristic from the speech database and training as an acoustic model may be needed.

A speech database, used for an acoustic model, may include sound data, for example, voice and text data indicating the voice. Sounds and texts are to be matched with each other for an accurate acoustic modeling. Otherwise, an optimized acoustic model may not be obtained, and a performance of a speech recognition system may be degraded.

A speech database may be established when a plurality of speakers read a previously selected utterance. Often, an utterance may not be read as written due to a linguistic phenomenon such as a fortis and lenis and/or an allophone. Accordingly, a pronunciation dictionary, used for an acoustic model training, may be used.

However, although the pronunciation dictionary is built based on a linguistic phenomenon, all pronunciation variations may not be considered, and an utterance may be pronounced differently by different speakers. For example, a non-linguistic phenomenon may occur based upon an education level, a growth process, and/or an age of a speaker. Further, a speaker may not accurately pronounce an utterance when recording.

SUMMARY

In one general aspect, there is provided an apparatus for extending a pronunciation dictionary for speech recognition, the apparatus including a receiving unit to receive speech information of an input utterance, a pronunciation variation sensing unit to segment the received speech information into one or more phonemes, to collect segmentation information of the one or more segmented phonemes, and to analyze a pronunciation variation of at least one segmented phoneme where a variation occurs, based on the collected segmentation information, and a pronunciation dictionary extension unit to select a substitutable phoneme group for the at least one segmented phoneme where the pronunciation variation occurs, and to extend the pronunciation dictionary.

The segmentation information may includes an acoustic score of the at least one segmented phoneme where the variation occurs, and the pronunciation variation sensing unit may segment the speech information into the at least one segmented phoneme where the variation occurs based on an acoustic model and the pronunciation dictionary, and collect the acoustic score of the at least one segmented phoneme.

The pronunciation variation sensing unit may select at least one phoneme with a low acoustic score from the one or more segmented phonemes as the phoneme where the pronunciation variation occurs, based on a predetermined point, the predetermined point being selected based on a distribution of acoustic scores of the one or more segmented phonemes.

The pronunciation dictionary extension unit may generate the substitutable phoneme group using a linguistic variation characteristic of a language corresponding to the pronunciation dictionary.

The pronunciation dictionary extension unit may decode the at least one phoneme where the pronunciation variation occurs, and a segmented portion of the speech information from among the substitutable phoneme group, using a Viterbi decoding algorithm, measure the acoustic score of the phoneme of the substitutable phoneme group, and select a phoneme with a highest acoustic score from the substitutable phoneme group, as a substitution phoneme.

The pronunciation dictionary extension unit may substitute the at least one segmented phoneme where the pronunciation variation occurs with the selected substitution phoneme, and register the selected substitution phoneme in the pronunciation dictionary.

The pronunciation dictionary extension unit may correct transcription data using an entry of the pronunciation dictionary, the entry being registered by substituting with the substitution phoneme.

The acoustic model may include a monophone model and a triphone model, and the pronunciation dictionary extension unit may generate the monophone model using an initial pronunciation dictionary of the pronunciation dictionary, correct the transcription data and extend the pronunciation dictionary using the generated monophone model, and generate the triphone model using the corrected transcription data, the extended pronunciation dictionary, and the monophone model.

The acoustic model may include a monophone model and a triphone model, and the pronunciation dictionary extension unit may generate the monophone model using an initial pronunciation dictionary of the pronunciation dictionary, generate the triphone model using the transcription data, the pronunciation dictionary, and the generated monophone model, correct the transcription data and extends the pronunciation dictionary using the generated triphone model, and regenerate the generated triphone model using the corrected transcription data, the extended pronunciation dictionary, and the monophone model.

In another general aspect, there is provided a method of extending a pronunciation dictionary for speech recognition, the method including receiving speech information of an input utterance, segmenting the received speech information into one or more phonemes, collecting segmentation information of the one or more segmented phonemes, analyzing a pronunciation variation of at least one segmented phoneme where a variation occurs, based on the collected segmentation information, and selecting a substitutable phoneme group for the at least one segmented phoneme where the pronunciation variation occurs, and extending the pronunciation dictionary.

The segmentation information may include an acoustic score of the at least one segmented phoneme, and the collecting may include segmenting the speech information into the at least one phoneme where the pronunciation variation occurs based on an acoustic model and the pronunciation dictionary, and collecting the acoustic score of the at least one segmented phoneme.

The analyzing may select at least one phoneme with a low acoustic score from the one or more segmented phonemes as the at least one phoneme where the pronunciation variation occurs, based on a predetermined point, the predetermined point being selected based on a distribution of acoustic scores of the one or more segmented phonemes.

The extending may generate a substitutable phoneme group for the at least one segmented phoneme where the variation occurs, using a linguistic variation characteristic of a language corresponding to the pronunciation dictionary.

The extending may include decoding the at least one phoneme where the variation occurs, and a segmented portion of the speech information from among the substitutable phoneme group, using a Viterbi decoding algorithm, and measuring the acoustic score of the phoneme of the substitutable phoneme group, and selecting a phoneme with a highest acoustic score from the substitutable phoneme group as a substitution phoneme.

The extending may further include substituting the at least one segmented phoneme where the variation occurs with the selected substitution phoneme, and registering the selected substitution phoneme in the pronunciation dictionary.

The extending may further include correcting transcription data using an entry of the pronunciation dictionary, the entry being registered by the substituting for the substitution phoneme.

The acoustic model may include a monophone model and a triphone model and the extending may include generating the monophone model using an initial pronunciation dictionary of the pronunciation dictionary, correcting the transcription data and extending the pronunciation dictionary using the generated monophone model, and generating the triphone model using the corrected transcription data, the extended pronunciation dictionary, and the monophone model.

The acoustic model may include a monophone model and a triphone model and the extending may include generating the monophone model using an initial pronunciation dictionary of the pronunciation dictionary, generating the triphone model using the transcription data, the pronunciation dictionary, and the generated monophone model, correcting the transcription data and extending the pronunciation dictionary using the generated triphone model, and regenerating the generated triphone model using the corrected transcription data, the extended pronunciation dictionary, and the monophone model.

In still another general aspect, there is provided a computer-readable recording medium storing a program for implementing a method of extending a pronunciation dictionary for speech recognition, the method including receiving speech information of an input utterance, segmenting the received speech information into one or more phonemes, collecting segmentation information of the one or more segmented phonemes, analyzing a pronunciation variation of at least one segmented phoneme where a variation occurs, based on the collected segmentation information, and selecting a substitutable phoneme group for the at least one phoneme where the pronunciation variation occurs, and extending the pronunciation dictionary.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
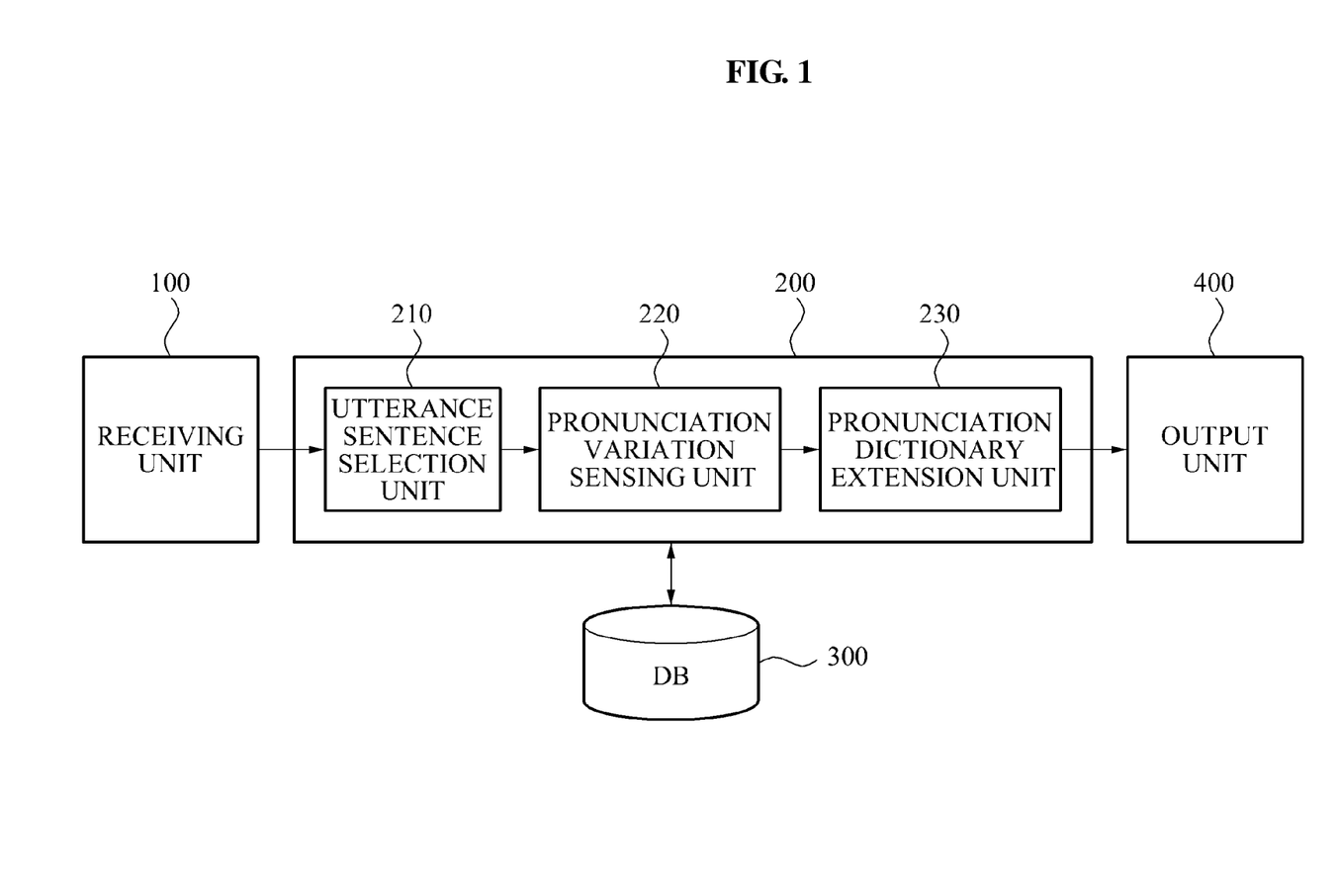
FIG. 1 is a diagram illustrating an exemplary apparatus for extending a pronunciation dictionary for speech recognition.

FIG. 1 illustrates an exemplary apparatus for extending a pronunciation dictionary for speech recognition.

The apparatus for extending a pronunciation dictionary used for speech recognition, hereinafter, referred to as the apparatus, may include a receiving unit 100, a speech recognition processing unit 200, a speech database 300, and an output unit 400. The speech recognition processing unit 200 may include an utterance selection unit 210, a pronunciation variation sensing unit 220, and/or a pronunciation dictionary extension unit 230.

The receiving unit 100 may receive speech information of an input utterance. The pronunciation variation sensing unit 220, included in the speech recognition processing unit 200, may segment the received speech information into one or more phonemes, collect segmentation information of the one or more segmented phonemes, and analyze a pronunciation variation of at least one of the one or more segmented phonemes where a variation occurs, based on the collected segmentation information.

For example, the segmentation information may include an acoustic score of at least one segmented phoneme. The pronunciation variation of the at least one segmented phoneme may be analyzed by collecting the acoustic scores.

The pronunciation dictionary extension unit 230, included in the speech recognition processing unit 200, may select a substitutable phoneme group including at least one phoneme, and extend the pronunciation dictionary. As referred to herein, a group includes one or more phonemes.

As described above, a receiving unit 100 of the apparatus may receive speech information of an input utterance. When pronunciation variation of the speech information is analyzed and detected, the apparatus may provide a method of extending or substituting a pronunciation dictionary and transcription data of a speech database 300.

In some embodiments, the receiving unit 100 may include a device that may receive speech information such as a microphone, and the like. The receiving unit 100 may transmit the received speech information to a speech recognition processing unit 200, and the speech recognition processing unit 200 may determine and process the pronunciation variation.

An utterance selection unit 210 of the apparatus may select a target utterance to detect a pronunciation variation phenomenon from the speech information received in the speech recognition processing unit 200.

In this instance, the speech database 300 may store an acoustic model, a language model, a pronunciation dictionary, transcription data, and the like, and include an utterance error set for extending the pronunciation dictionary.

The utterance error set, stored in the speech database 300, may include an utterance which is frequently misrecognized. The error utterance set may include utterances that are entered by a user using the apparatus.

The speech database 300 may be included in the speech recognition processing unit 200, or the speech database 300 may be separately installed.

Hereinafter, a method of extending a pronunciation dictionary for speech recognition is described, referring to the above-described apparatus.

Figure 2:
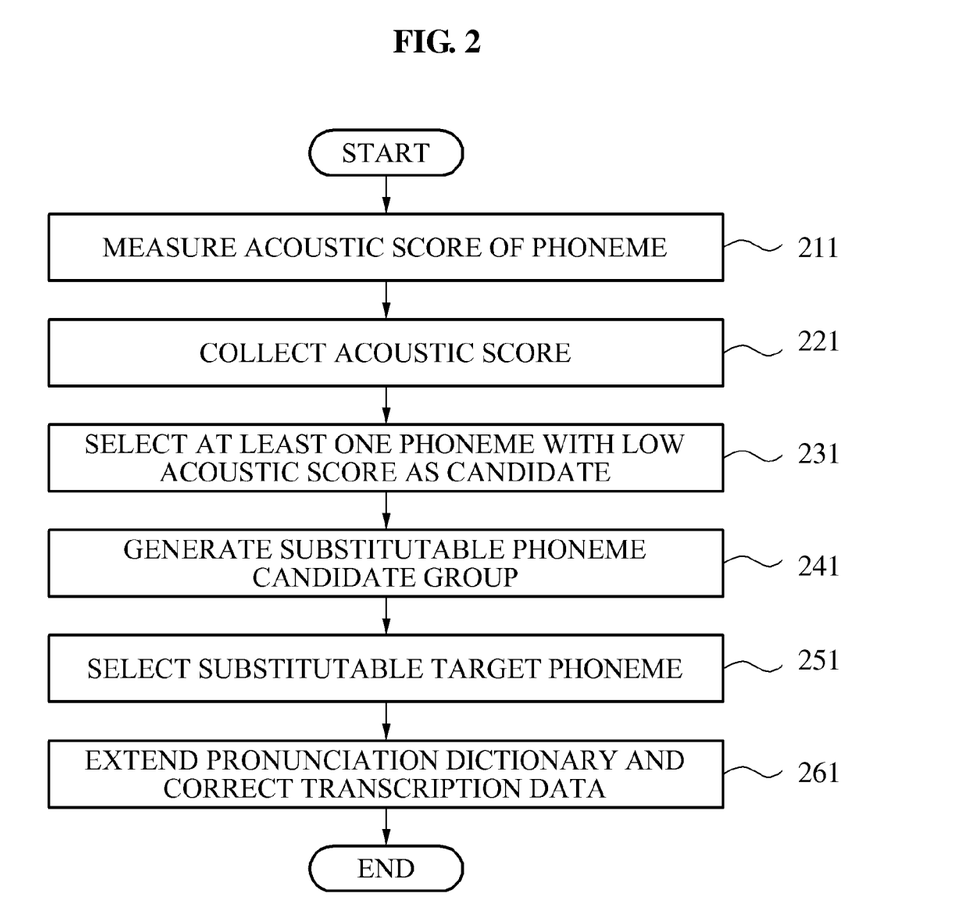
FIG. 2 is a flowchart illustrating an exemplary method for extending a pronunciation dictionary for speech recognition.

FIG. 2 shows a flowchart illustrating an exemplary method for extending a pronunciation dictionary for speech recognition.

In 211, a pronunciation variation sensing unit 220 of the apparatus may segment the speech information into one or more phonemes, based on the acoustic model and the pronunciation dictionary. The pronunciation variation sensing unit 220 may further measure an acoustic score of the one or more segmented phonemes. In 221, the pronunciation variation sensing unit 220 may collect the acoustic score of the one or more segmented phonemes.

In 231, the pronunciation variation sensing unit 220 may select at least one phoneme, from the one or more segmented phonemes as a phoneme where the pronunciation variation may have occurred, based on a predetermined point. The at least one phoneme selected may be based on the acoustic score of the phoneme. For example, a phoneme with a low acoustic score may be selected. The predetermined point may be selected based on a distribution of acoustic scores of the one or more phonemes.

Figure 3A:
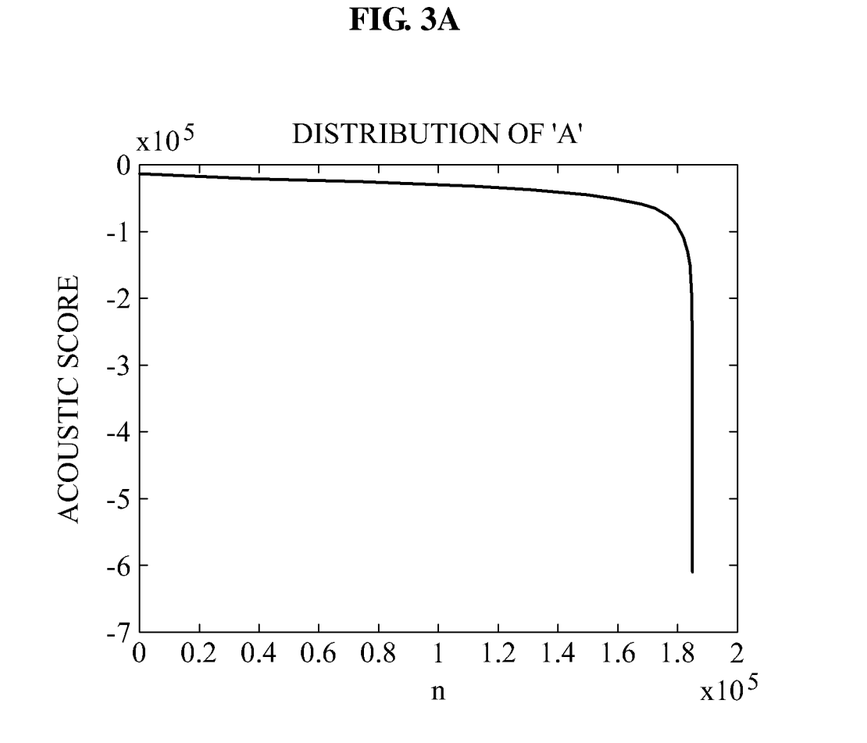
FIGS. 3A and 3B illustrate examples of acoustic score distributions of a phoneme.
Figure 3B:
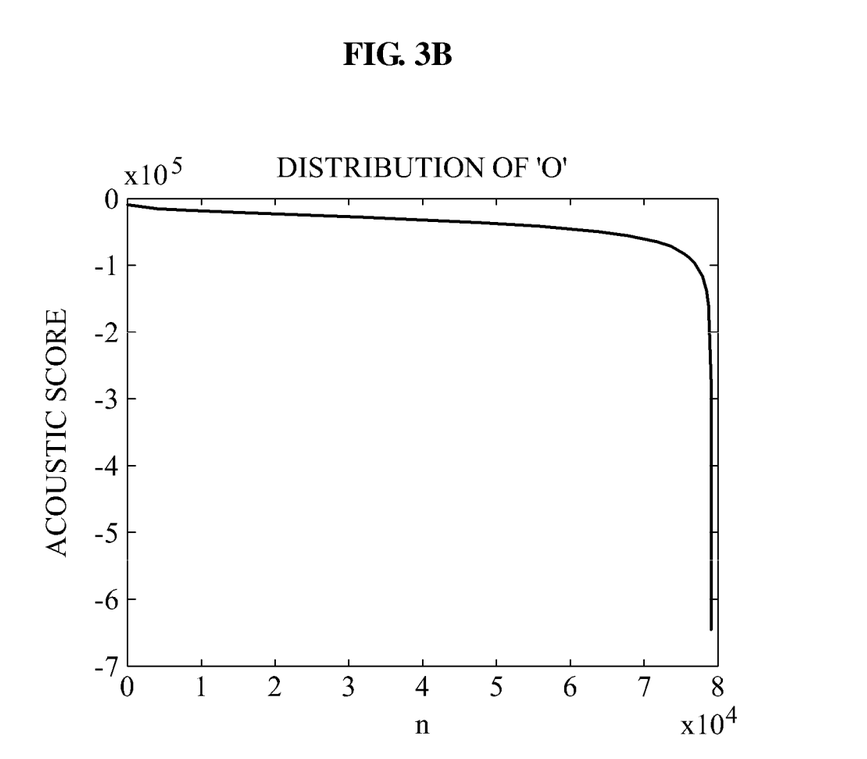

FIGS. 3A and 3B illustrate examples of acoustic score distributions of a phoneme.

For example, when the segmented phoneme is 'A', the pronunciation variation sensing unit 220 may select a predetermined point by referring to the score distribution illustrated in FIG. 3A, and select a phoneme where the pronunciation variation may occur. When the segmented phoneme is 'O', the pronunciation variation sensing unit 220 may select a predetermined point by referring to the score distribution in FIG. 3B, and select a phoneme where the pronunciation variation may occur.

In 241, the pronunciation dictionary extension unit 230 may generate a substitutable phoneme group for the at least one phoneme where the variation occurs, using a linguistic variation characteristic of a language corresponding to the pronunciation dictionary.

Figure 4:
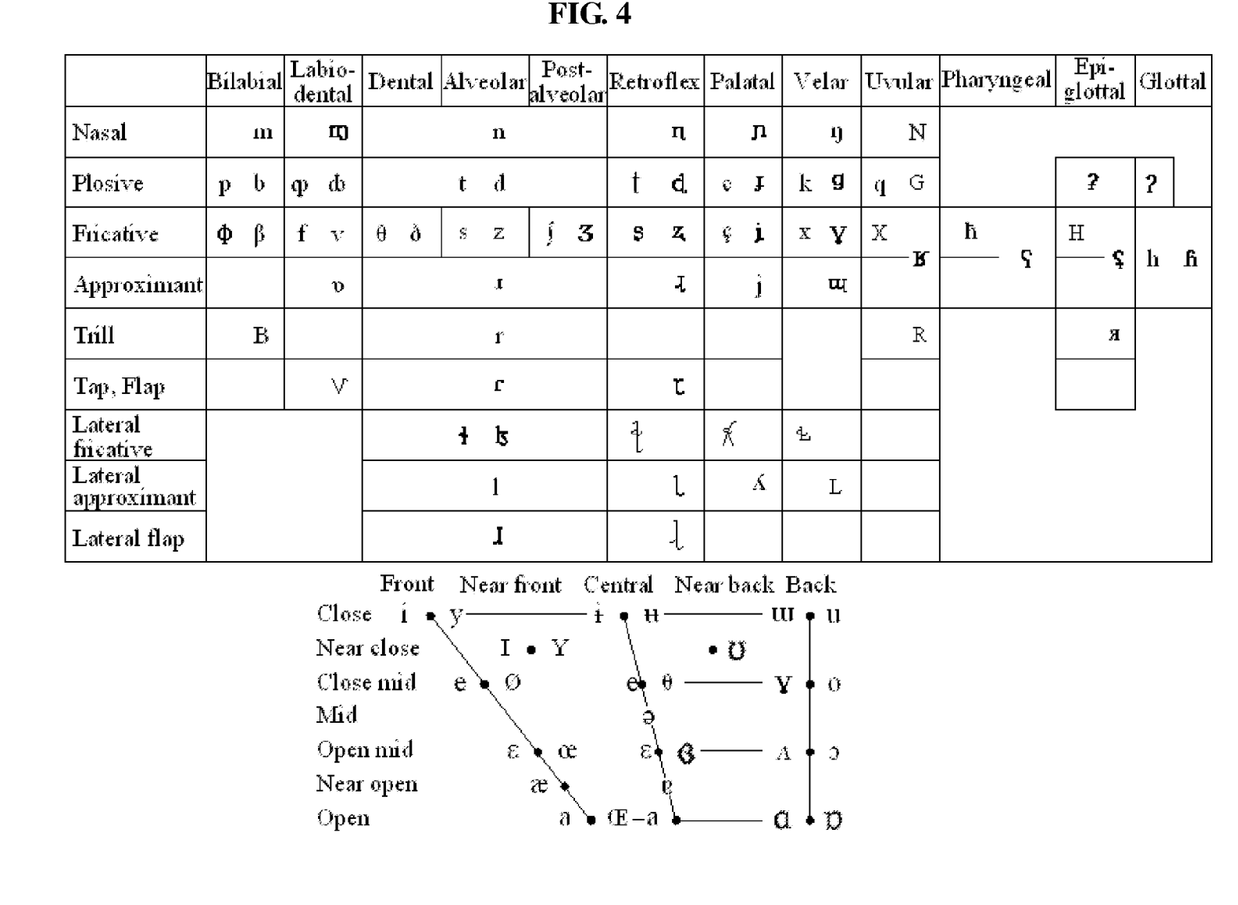
FIG. 4 is a diagram illustrating an example of a substitutable phoneme standard table.

FIG. 4 illustrates an example of a substitutable phoneme standard table.

For example, referring to FIG. 4, the apparatus may select the substitutable phoneme group by dividing the segmented phoneme into a consonant group and a vowel group.

In some embodiments, the apparatus may segment the consonant group and/or the vowel group using a characteristic of a phoneme of a consonant or a vowel, and perform segmentation according to a place of articulation, a manner of articulation, and the like.

In 251, the pronunciation dictionary extension unit 230 may decode the at least one phoneme where the variation occurs, and decode a segmented portion of the speech information from among the substitutable phoneme group, using a Viterbi decoding algorithm. The pronunciation dictionary extension unit 230 may measure the acoustic score of the at least one phoneme where the variation occurs, and select a phoneme with the highest acoustic score from the substitutable phoneme group, as a substitution phoneme.

In 261, the pronunciation dictionary extension unit 230 may substitute the at least one segmented phoneme where the variation occurs for the selected substitution target phoneme and register the selected substitution phoneme in the pronunciation dictionary, and the pronunciation extension unit 230 may extend the pronunciation dictionary and register the selected substitution phoneme.

For example, the pronunciation dictionary extension unit 230 may correct transcription data using an entry of the pronunciation dictionary. The entry may be registered by substituting for the substitution phoneme.

The apparatus may perform a speech recognition model training when extending the pronunciation dictionary. The speech recognition model training is described in detail with reference to FIGS. 5 and 6.

Figure 5:
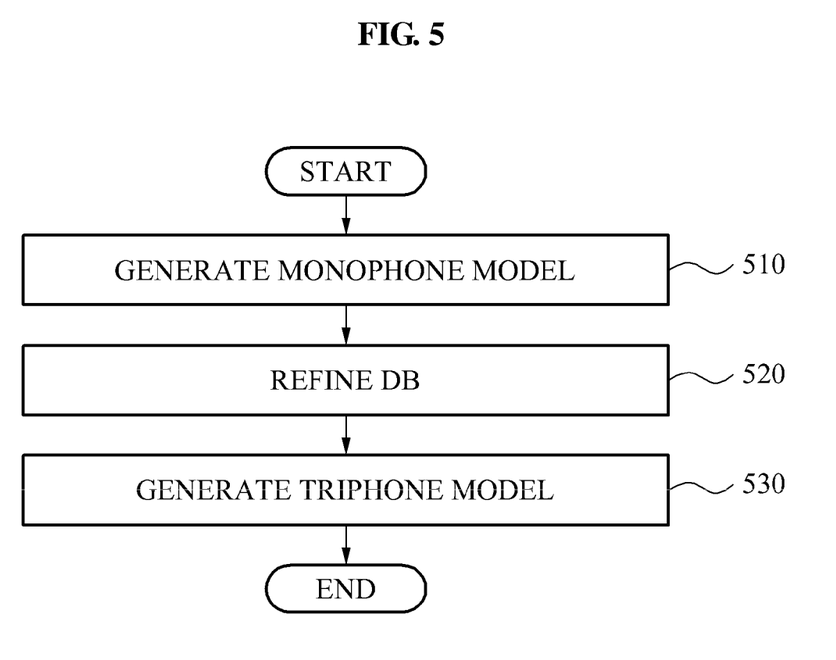
FIG. 5 is a flowchart illustrating an exemplary speech recognition model training method.

FIG. 5 illustrates an exemplary speech recognition model training method.

An apparatus may apply a monophone model, a triphone model, and the like, as an acoustic model.

For example, as illustrated in FIG. 5, the pronunciation dictionary extension unit 230 may generate the monophone model using an initial pronunciation dictionary of the pronunciation dictionary, in 510.

In 520, the pronunciation dictionary extension unit 230 may correct the transcription data, stored in the speech database 300, using the generated monophone model, and may refine the speech database 300, for example, by extending the pronunciation dictionary.

In 530, the pronunciation dictionary extension unit 230 may generate the triphone model using the transcription data, the extended pronunciation dictionary, and the generated monophone model.

Figure 6:
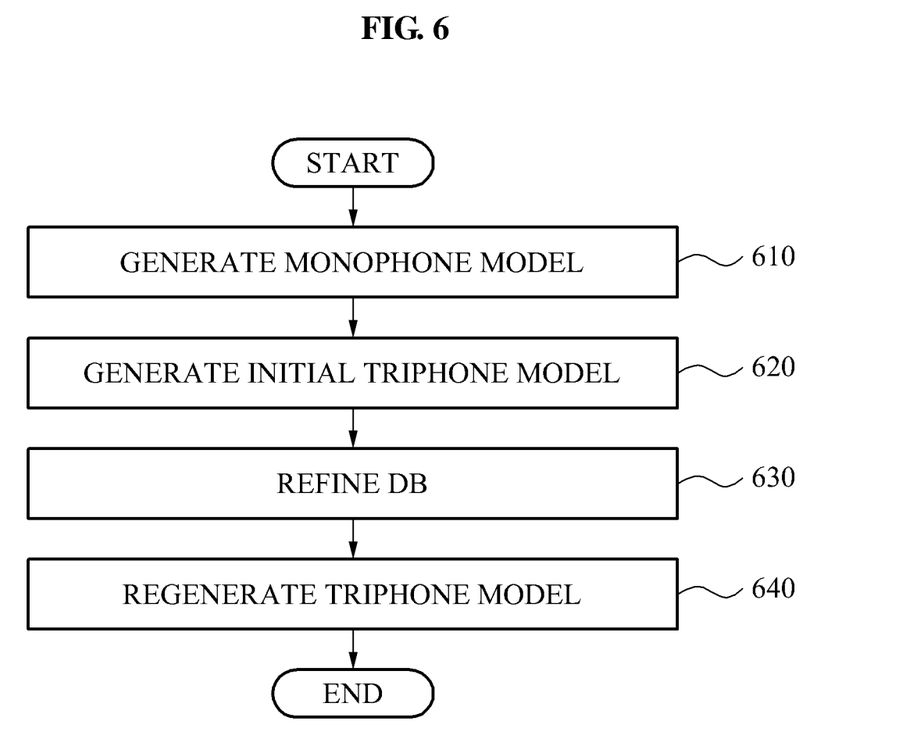
FIG. 6 is a flowchart illustrating another example of a speech recognition model training method.

FIG. 6 illustrates another example of a speech recognition model training method.

As illustrated in FIG. 6, in 610 the pronunciation dictionary extension unit 230 may generate the monophone model using an initial pronunciation dictionary.

In 620, the pronunciation dictionary extension unit 230 may generate an initial triphone model using the transcription data, the pronunciation dictionary, and the generated monophone model.

In 630, the pronunciation dictionary extension unit 230 may correct the transcription data, stored in the speech database 300, using the generated initial triphone model, and refine the speech database 300, for example, by extending the pronunciation dictionary.

In 640, the pronunciation dictionary extension unit 230 may regenerate the generated initial triphone model using the corrected transcription data, the extended pronunciation dictionary, and the monophone model.

Accordingly, various pronunciation variation phenomena may be detected from a speech database without a user's input, extend a pronunciation, and correct a difference between sound data and transcription data.

The differentiation of phonemes in a speech recognition model may be enhanced, and thus an improved speech recognition system may be provided.

A pronunciation dictionary for speech recognition that may reflect characteristics of a variety of speakers, and process a number of pronunciation variation phenomena in data, may be provided.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media may include magnetic media such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like Examples of program instructions include both machine code, such as produced by a compiler, and files containing higher level code that may be executed by the computer using an interpreter. The described hardware devices may be configured to act as one or more software modules in order to perform the methods and/or operations described above, or vice versa. In addition, a computer-readable storage medium may be distributed among computer systems connected through a network and computer-readable codes or program instructions may be stored and executed in a decentralized manner.

A number of examples of implementations have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for extending a pronunciation dictionary for speech recognition, the apparatus comprising:
   a receiving unit to receive speech information of an input utterance;
   a pronunciation variation sensing unit to segment the received speech information into one or more phonemes, to collect acoustic scores of the one or more segmented phonemes, and to determine a pronunciation variation occurs at a segmented phoneme based on a comparison of a collected acoustic score of the segmented phoneme and a predetermined acoustical score distribution of the segmented phoneme; and
   a pronunciation dictionary extension unit to select a substitutable phoneme group based on the segmented phoneme where the pronunciation variation occurs, and to adaptively extend the pronunciation dictionary based on the selected substitutable phoneme group.

2. The apparatus of claim 1, wherein the pronunciation variation sensing unit segments the speech information into the one or more phonemes based on an acoustic model and the pronunciation dictionary.

3. The apparatus of claim 2, wherein the pronunciation variation sensing unit selects a segmented phoneme with a lowest acoustic score from the one or more segmented phonemes as the phoneme where the pronunciation variation occurs, based on a predetermined point, the predetermined point being selected based on the predetermined acoustical score distribution of the segmented phoneme.

4. The apparatus of claim 1, wherein the pronunciation dictionary extension unit generates the substitutable phoneme group using a linguistic variation characteristic of a language corresponding to the pronunciation dictionary.

5. The apparatus of claim 3, wherein the pronunciation dictionary extension unit decodes the segmented phoneme where the pronunciation variation occurs, and a segmented portion of the speech information from among the substitutable phoneme group, using a Viterbi decoding algorithm, measures the acoustic score of the phoneme of the substitutable phoneme group, and selects a phoneme with a highest acoustic score from the substitutable phoneme group, as a substitution phoneme.

6. The apparatus of claim 5, wherein the pronunciation dictionary extension unit substitutes the segmented phoneme where the pronunciation variation occurs with the selected substitution phoneme, and registers the selected substitution phoneme in the pronunciation dictionary.

7. The apparatus of claim 6, wherein the pronunciation dictionary extension unit corrects transcription data using an entry of the pronunciation dictionary, the entry being registered by substituting with the substitution phoneme.

8. The apparatus of claim 7, wherein the acoustic model includes a monophone model and a triphone model, and the pronunciation dictionary extension unit:
   generates the monophone model using an initial pronunciation dictionary of the pronunciation dictionary,
   corrects the transcription data and extends the pronunciation dictionary using the generated monophone model, and
   generates the triphone model using the corrected transcription data, the extended pronunciation dictionary, and the monophone model.

9. The apparatus of claim 7, wherein the acoustic model includes a monophone model and a triphone model, and the pronunciation dictionary extension unit:
   generates the monophone model using an initial pronunciation dictionary of the pronunciation dictionary,
   generates the triphone model using the transcription data, the pronunciation dictionary, and the generated monophone model,
   corrects the transcription data and extends the pronunciation dictionary using the generated triphone model, and
   regenerates the generated triphone model using the corrected transcription data, the extended pronunciation dictionary, and the monophone model.

10. A method of extending a pronunciation dictionary for speech recognition, the method comprising:
    receiving speech information of an input utterance;
    segmenting the received speech information into one or more phonemes;
    collecting acoustic scores of the one or more segmented phonemes;
    determining a pronunciation variation occurs at a segmented phoneme based on a comparison of a collected acoustic score of the segmented phoneme and a predetermined acoustical score distribution of the segmented phoneme;
    selecting a substitutable phoneme group based on the segmented phoneme where the pronunciation variation occurs, and extending the pronunciation dictionary based on the selected substitutable phoneme group; and storing the extended pronunciation dictionary in a storage device.

11. The method of claim 10, wherein the segmenting comprises segmenting the speech information into the one or more phonemes based on an acoustic model and the pronunciation dictionary.

12. The method of claim 11, wherein the determining comprises selecting a segmented phoneme with a lowest acoustic score from the one or more segmented phonemes as the phoneme where the pronunciation variation occurs, based on a predetermined point, the predetermined point being selected based on the predetermined acoustical score distribution of the segmented phoneme.

13. The method of claim 12, wherein the extending generates a substitutable phoneme group for the segmented phoneme where the variation occurs, using a linguistic variation characteristic of a language corresponding to the pronunciation dictionary.

14. The method of claim 13, wherein the extending comprises:

decoding the phoneme where the variation occurs, and a segmented portion of the speech information from among the substitutable phoneme group, using a Viterbi decoding algorithm, and measuring the acoustic score of the phoneme of the substitutable phoneme group; and selecting a phoneme with a highest acoustic score from the substitutable phoneme group as a substitution phoneme.

15. The method of claim 14, wherein the extending further comprises:

substituting the segmented phoneme where the variation occurs with the selected substitution phoneme, and registering the selected substitution phoneme in the pronunciation dictionary.

16. The method of claim 15, wherein the extending further comprises:

correcting transcription data using an entry of the pronunciation dictionary, the entry being registered by the substituting for the substitution phoneme.

17. The method of claim 16, wherein the acoustic model includes a monophone model and a triphone model and the extending comprises:

generating the monophone model using an initial pronunciation dictionary of the pronunciation dictionary;

correcting the transcription data and extending the pronunciation dictionary using the generated monophone model; and generating the triphone model using the corrected transcription data, the extended pronunciation dictionary, and the monophone model.

18. The method of claim 16, wherein the acoustic model includes a monophone model and a triphone model and the extending comprises:

generating the monophone model using an initial pronunciation dictionary of the pronunciation dictionary;

generating the triphone model using the transcription data, the pronunciation dictionary, and the generated monophone model;

correcting the transcription data and extending the pronunciation dictionary using the generated triphone model; and regenerating the generated triphone model using the corrected transcription data, the extended pronunciation dictionary, and the monophone model.

19. A non-transitory computer-readable recording medium storing a program for implementing a method of extending a pronunciation dictionary for speech recognition, the method comprising:

receiving speech information of an input utterance;

segmenting the received speech information into one or more phonemes;

collecting acoustic scores of the one or more segmented phonemes;

determining a pronunciation variation occurs at a segmented phoneme based on a comparison of a collected acoustic score of the segmented phoneme and a predetermined acoustical score distribution of the segmented phoneme; and selecting a substitutable phoneme group based the phoneme where the pronunciation variation occurs, and extending the pronunciation dictionary based on the selected substitutable phoneme group.

* * * * *